(12) United States Patent
Zhong et al.

(10) Patent No.: US 12,196,161 B2
(45) Date of Patent: Jan. 14, 2025

(54) EGR MIXING AND ADJUSTING APPARATUS AND INTERNAL COMBUSTION ENGINE

(71) Applicant: WEICHAI POWER CO., LTD., Shandong (CN)

(72) Inventors: Yuelan Zhong, Shandong (CN); Ziyang Dai, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 105 days.

(21) Appl. No.: 16/955,821

(22) PCT Filed: Aug. 7, 2018

(86) PCT No.: PCT/CN2018/099162
§ 371 (c)(1),
(2) Date: Jun. 19, 2020

(87) PCT Pub. No.: WO2019/128241
PCT Pub. Date: Jul. 4, 2019

(65) Prior Publication Data
US 2024/0229750 A1   Jul. 11, 2024

(30) Foreign Application Priority Data
Dec. 26, 2017   (CN) .......................... 201711428746.2

(51) Int. Cl.
*F02M 26/19*   (2016.01)
*F02M 35/10*   (2006.01)

(52) U.S. Cl.
CPC ...... *F02M 35/10262* (2013.01); *F02M 26/19* (2016.02); *F02M 35/10222* (2013.01)

(58) Field of Classification Search
CPC ....... F02M 35/10262; F02M 35/10222; F02M 26/19; F02B 37/00
See application file for complete search history.

(56) References Cited

U.S. PATENT DOCUMENTS 5,526,850 A    6/1996  Sora et al.
11,002,227 B2 *  5/2021  Zhong .................... F02M 26/21
(Continued)

FOREIGN PATENT DOCUMENTS

CN    1106086 A    8/1995
CN    202628319 U   12/2012
(Continued)

OTHER PUBLICATIONS

International Search Report for corresponding International application No. PCT/JP2018/099162; Mail date: Oct. 31, 2018.
(Continued)

*Primary Examiner* — Gonzalo Laguarda
(74) *Attorney, Agent, or Firm* — CANTOR COLBURN LLP

(57) ABSTRACT

An EGR mixing and adjusting apparatus and an internal combustion engine including the EGR mixing and adjusting apparatus. The EGR mixing and adjusting apparatus includes an EGR tube internally provided with an EGR mixing chamber. An exhaust gas inlet communicating with the EGR mixing chamber is provided at a side wall of the EGR tube. A gas guide sliding block is provided within the EGR tube and slides axially therein to block or open the exhaust gas inlet. The EGR mixing and adjusting apparatus includes a driving device to drive the gas guide sliding block to slide to a predetermined open position. The EGR tube uses the exhaust gas inlet to guide exhaust gas into the EGR mixing chamber and mixes the exhaust gas with fresh air inside the EGR tube. The gas guide sliding block slides axially in the EGR tube to block or open the exhaust gas inlet.

12 Claims, 4 Drawing Sheets

(56) References Cited

U.S. PATENT DOCUMENTS

2007/0256413 A1    11/2007  Marsal et al.
2011/0030372 A1*   2/2011  Ooshima ................ F02M 26/23
                                                          60/605.2
2016/0153403 A1     6/2016  Guidi et al.

FOREIGN PATENT DOCUMENTS

| | | |
|---|---|---|
| CN | 103195947 A | 7/2013 |
| CN | 105626321 A | 6/2016 |
| CN | 107218160 A | 9/2017 |
| CN | 108180091 A | 6/2018 |
| DE | 19636806 A1 | 3/1998 |
| EP | 1598543 A1 | 11/2005 |
| FR | 2894294 B1 | 1/2008 |
| KR | 20050060167 A | 6/2005 |

OTHER PUBLICATIONS

EPO Extended Search Report for corresonding EP Application No. 18894168.6; Dated, Jun. 16, 2021.

* cited by examiner

EGR MIXING AND ADJUSTING APPARATUS AND INTERNAL COMBUSTION ENGINE

CROSS REFERENCE TO RELATED APPLICATIONS

This is the U.S. national stage of application No. PCT/CN2018/099162, filed on Aug. 7, 2018. Priority under 35 U.S.C. § 119 (a) and 35 U.S.C. § 365 (b) is claimed from Chinese Application No. 201711428746.2, filed on Dec. 26, 2017the disclosure of which is also incorporated herein by reference.

FIELD

The present application relates to the technical field of internal combustion engines, and in particular to an EGR mixing and adjusting device and an internal combustion engine.

BACKGROUND

EGR, the full name of which is Exhaust Gas Recirculation, refers to exhaust gas recirculation, that is, exhaust gas discharged from an engine is reintroduced into an inlet pipe, and enters into a combustion chamber for combustion after mixing with fresh gas, which can effectively reduce the emission of $NO_x$ from the engine.

The adoption of EGR technology has become a necessary solution to meet the emissions of EU6 and CN6, and EGR mixing uniformity directly affects the consistency and stability of the combustion of each cylinder. The design of the EGR mixer is always a relatively complex part, which needs to solve the problem of uniformity, at the same time, to ensure sufficient circulation capacity and to reduce the pressure loss.

The EGR valve used in the conventional technology is a butterfly valve or a poppet valve that is separately mounted in an EGR circuit for controlling the EGR flow. The mixer needs to be designed separately, which is often difficult to consider the space, meanwhile, the design cost is high.

Here, it should be noted that the technical solution provided in this section is intended to facilitate an understanding of the present application for those skilled in the art, and does not necessarily constitute the conventional technology.

SUMMARY

In view of the foregoing, an object of the present application is to provide an EGR mixing and adjusting device to optimize the control structure of the EGR valve; and an internal combustion engine is further provided in the present application.

According to one aspect of the present application, an EGR mixing and adjusting device is provided, which includes an EGR pipe internally provided with an EGR mixing chamber, and an exhaust gas inlet channel in communication with the EGR mixing chamber is provided in a side wall of the EGR pipe.

A gas guide sliding block for blocking or opening the exhaust gas inlet channel is slidably provided in the EGR pipe along an axial direction, and the EGR mixing and adjusting device further includes a driving device for driving the gas guide sliding block to slide to a predetermined opening degree.

Preferably, in the EGR mixing and adjusting device described above, the gas guide sliding block includes a gas guide channel communicating the exhaust gas inlet channel with the EGR mixing chamber, and a blocking structure for blocking the exhaust gas inlet channel.

Preferably, in the EGR mixing and adjusting device described above, the gas guide sliding block is a gas guide cylinder slidably fitting with an inner wall of the EGR pipe, and the gas guide channel and the blocking structure are respectively arranged on cylinder walls at two ends of the gas-guide cylinder in the axial direction.

Preferably, in the EGR mixing and adjusting device described above, an exhaust gas guide groove corresponding to the position of the exhaust gas inlet channel is circumferentially provided on the inner wall of the EGR pipe, and the length of the gas guide channel is consistent with the groove width of the exhaust gas guide groove; and multiple gas guide channels are uniformly arranged in the circumferential direction of the gas guide cylinder.

Preferably, in the EGR mixing and adjusting device described above, the multiple gas guide channels are uniformly arranged around a cylinder wall of the gas guide cylinder.

Preferably, in the EGR mixing and adjusting device described above, a guide vane for guiding the inlet gas in the gas guide channel is provided on the inner wall of the gas guide cylinder, and the guide vane is inclined in the radial direction of the gas guide cylinder and extends inward.

Preferably, in the EGR mixing and adjusting device described above, the blocking structure includes a subtractive groove provided around a circumference of the gas guide cylinder, and a groove width of the subtractive groove is consistent with the groove width of the exhaust gas guide groove.

Preferably, in the EGR mixing and adjusting device described above, the EGR pipe includes an EGR main pipe arranged at one end of the EGR pipe in the axial direction to support the driving device, and an exhaust gas mixing pipe sleeved with the gas guide cylinder, and the pipe diameter of the EGR main pipe is the same as the inner diameter of the gas guide cylinder.

Preferably, in the EGR mixing and adjusting device described above, the guiding channel is provided on the inner side of the gas guide cylinder in a sliding direction.

An internal combustion engine is internally provided with an EGR mixing and adjusting device as described in any one of the above.

The EGR mixing and adjusting device according to the present application includes an EGR pipe internally provided with an EGR mixing chamber, an exhaust gas inlet channel in communication with the EGR mixing chamber is formed in the side wall of the EGR pipe; a gas sliding block for blocking or opening the exhaust gas inlet channel is slidably provided in the EGR pipe along an axial direction, and the EGR mixing and adjusting device further includes a driving device to drive the gas guide sliding block to slide to a predetermined degree. An EGR mixing chamber for mixing fresh air and exhaust gas is arranged in the EGR pipe, an exhaust gas inlet channel is formed in the side wall of the EGR pipe to introduce exhaust gas into the EGR mixing chamber, and the exhaust gas is mixed with fresh air entering into the EGR pipe.

A gas guide sliding block is arranged in the EGR pipe. The gas guide sliding block can slide axially within the EGR pipe. The exhaust gas inlet channel is blocked or opened in the sliding process. The sliding movement of the gas guide sliding block is adjusted by the driving device, the opening degree of the exhaust gas inlet channel is controlled by the gas guide sliding block in the sliding process, the exhaust gas flow control is achieved by integrating the mixture of the exhaust gas and the fresh air into the EGR pipe and controlling the opening degree of the exhaust gas inlet channel by the sliding drive of the driving device to the gas guide sliding block, so that the EGR mixing and adjusting device realizes adjustment to the exhaust gas and simplified structure at the same time, thereby realizing the optimal arrangement of the EGR valve.

BRIEF DESCRIPTION OF THE DRAWING

The foregoing and other objects, features, and advantages of the present application will become more apparent through the following description of embodiments of the present application with reference to the accompanying drawings, in which.

DETAIL DESCRIPTION

The present application is described below based on the embodiments, and the present application is not limited to these embodiments.

Figure 1:
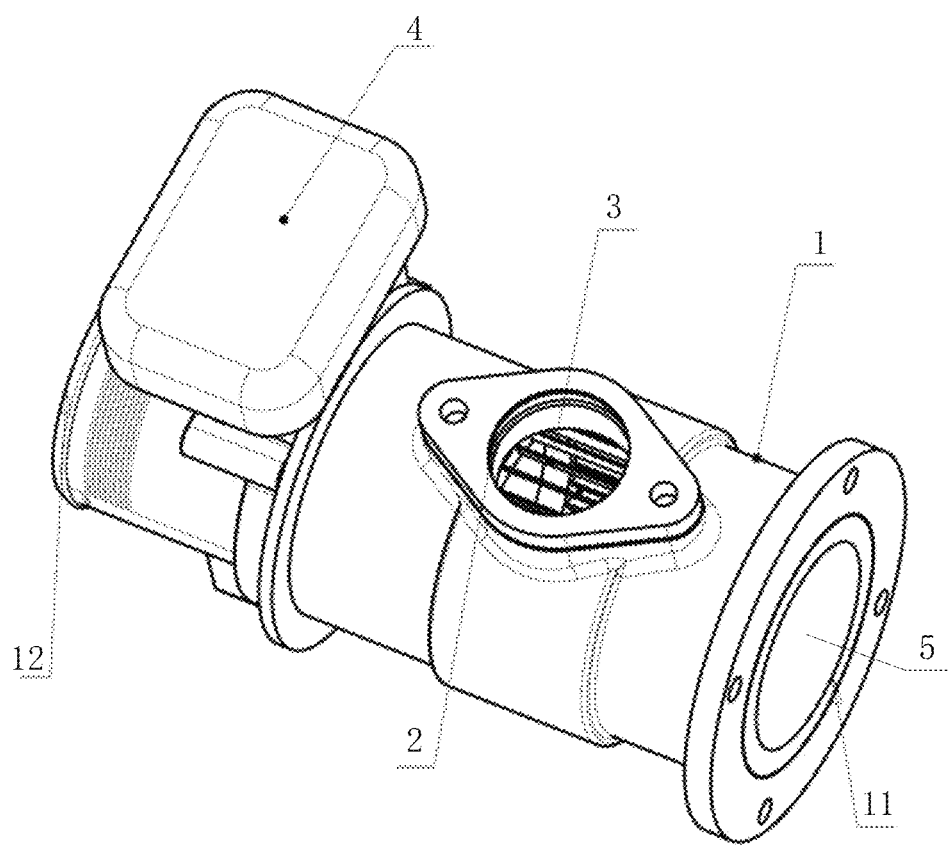
FIG. 1 is a front view of an EGR mixing and adjusting device according to the present application.
Figure 2:
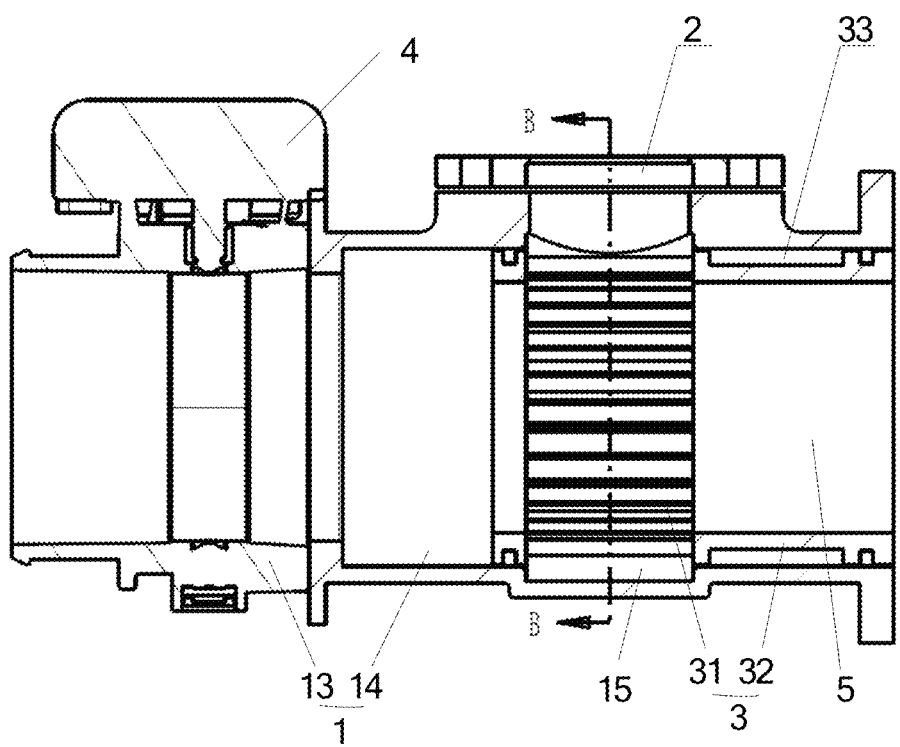
FIG. 2 is a schematic sectional view of the EGR mixing and adjusting device shown in FIG. 3 taken along the A-A vertical direction.
Figure 3:
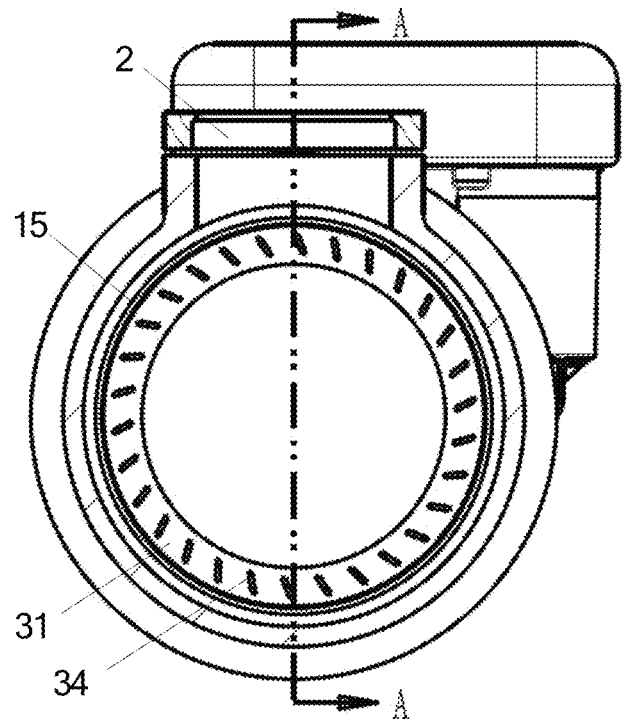
FIG. 3 is a sectional view of FIG. 2 taken along the B-B direction.

As shown in FIG. 1 to FIG. 3, FIG. 1 is a front view of an EGR mixing and adjusting device according to the present application; FIG. 2 is a schematic sectional view of the EGR mixing and adjusting device shown in FIG. 3 taken along the A-A vertical direction; and FIG. 3 is a sectional view of FIG. 2 taken along the B-B direction.

The present application provides an EGR mixing and adjusting device which includes an EGR pipe 1 internally provided with an EGR mixing chamber 5, and an exhaust gas inlet channel 2 in communication with the EGR mixing chamber 5 is provided on the side wall of the EGR pipe 1. A gas guide sliding block 3 for blocking or opening the exhaust gas inlet channel 2 is slidably provided in the EGR pipe I along an axial direction of the ERG pipe 1, and the EGR mixing and adjusting device further includes a driving device 4 to drive the gas guide sliding block 3 to slide to a predetermined opening degree. An EGR mixing chamber 5 for mixing fresh air and exhaust gas is arranged in the EGR pipe 1, and an exhaust gas inlet channel is provided in the side wall of the EGR pipe to introduce the exhaust gas into the EGR mixing chamber, and the exhaust gas is mixed with fresh air entering into the EGR pipe. The gas guide sliding block 3 is arranged in the EGR pipe 1, the gas guide sliding block 3 can slide axially within the EGR pipe 1. The exhaust gas inlet channel 2 is blocked or opened in the sliding process. The sliding movement of the gas guide sliding block 3 is adjusted by the driving device 4. In the sliding process, the opening degree of the exhaust gas inlet channel 2 is controlled by the gas guide sliding block 3. The exhaust gas flow is controlled by integrating the mixture of the exhaust gas and the fresh air into the EGR pipe 1 and controlling the opening degree of the exhaust gas inlet channel through the sliding driving of the driving device 4 to the gas guide sliding block 3, so that the EGR mixing and adjusting device achieves the adjustment to the exhaust gas and simplified structure at the same time, thereby achieving the optimal arrangement of the EGR valve.

In an embodiment of the present application, the gas guide sliding block 3 includes a gas guide channel 31 communicating the exhaust gas inlet channel with an EGR mixing chamber 5, and a blocking structure 32 for blocking the exhaust gas inlet channel 2. The gas guide sliding block 3 is slidable on an inner wall of the EGR pipe 1, to block the exhaust gas inlet channel 2 in the sliding process. The separate gas guide sliding block 3 can control the opening degree of the exhaust gas inlet channel 2 and block the exhaust gas inlet channel 2, but cannot control the inlet direction of the exhaust gas input from the exhaust gas inlet channel 2. And the direction of the mixture of the exhaust gas and the fresh air can be optimized by controlling the direction among the gas guide channel 31 and the exhaust gas inlet channel 2 and the EGR mixing chamber 5 and by providing the gas guide channel 31 corresponding to the position of the exhaust gas inlet channel 2 on the gas guide sliding block 3. The inlet gas of the gas guide channel 31 can be arranged along the inner wall of the EGR mixing chamber 5, so that the inlet gas is distributed in a spiral shape, and the mixing uniformity is improved. Meanwhile, a guide rail for guiding the sliding movement of the gas guide sliding block 3 is arranged in the EGR gas mixing chamber 5, ensuring that the stability of the sealing structure of the exhaust gas inlet channel in the sliding process of the gas guide sliding block 3.

In an embodiment of the present application, the gas guide sliding block 3 is a gas guide cylinder slidably fitting with the inner wall of the EGR pipe 1, and the gas guide channel 31 and the blocking structure 32 are respectively arranged on cylinder walls on two ends of the gas guide cylinder 3 in the axial direction. The gas guide sliding block 3 is blown by the exhaust gas and the fresh air during its sliding movement in the EGR pipe 1. In order to ensure the stability of the sliding structure of the gas guide sliding block 3, the gas guide sliding block 3 is arranged to be a gas guide cylinder structure. The outer diameter of the gas guide cylinder is fitting with the inner diameter of the EGR pipe 1, and the gas guide channel 31 and the blocking structure 32 are respectively located on two ends of the gas guide cylinder in the axial direction. By the sliding movement of the gas guide cylinder in the EGR pipe 1, the exhaust gas enters into the EGR mixing chamber 5 when the gas guide channel 31 on the gas guide cylinder is opposite to the position of the exhaust gas inlet channel 2, to mix with the fresh air. When the gas guide cylinder slides to the extreme position of the blocking structure 32, the outer wall of the gas guide cylinder blocks the exhaust gas inlet channel 2, and the exhaust gas cannot enter the EGR mixing chamber 5 from the gas guide cylinder. The gas guide cylinder is driven by the driving device 4 to slide in the EGR pipe 1. When the inlet gas direction of the exhaust gas inlet channel 2 is located in the middle position of the blocking structure 32 and the gas guide channel 31, a part of exhaust gas can pass through the gas guide channel 31, and the rest are blocked by the outer wall of the blocking structure 32 of the gas guide cylinder and cannot smoothly enter the EGR mixing chamber, thereby achieving the control of the opening degree of the gas guide channel.

Figure 4:
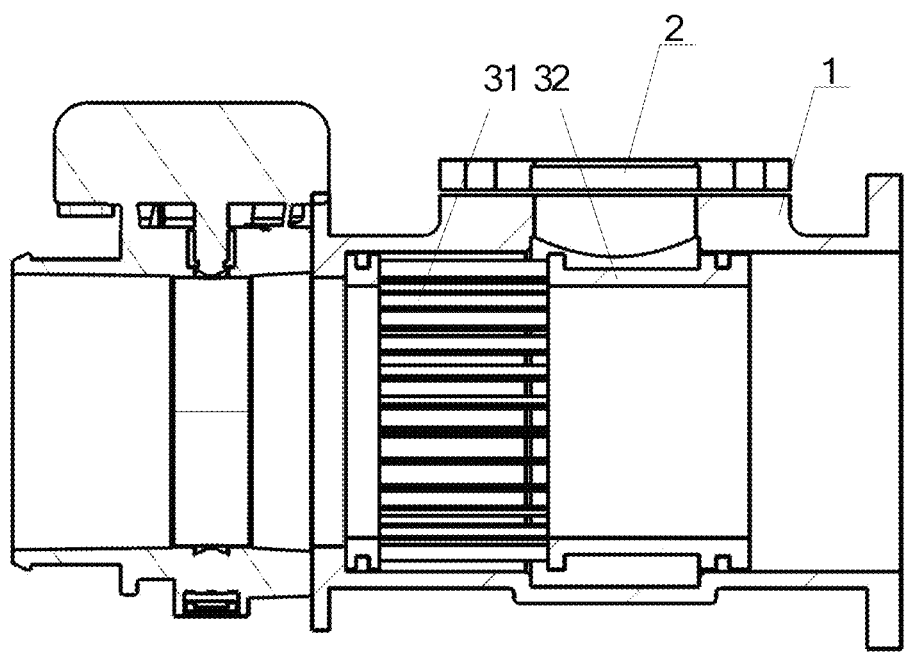
FIG. 4 is an arrangement structural view when the opening degree of the exhaust gas inlet channel is adjusted in the present application.
Figure 5:
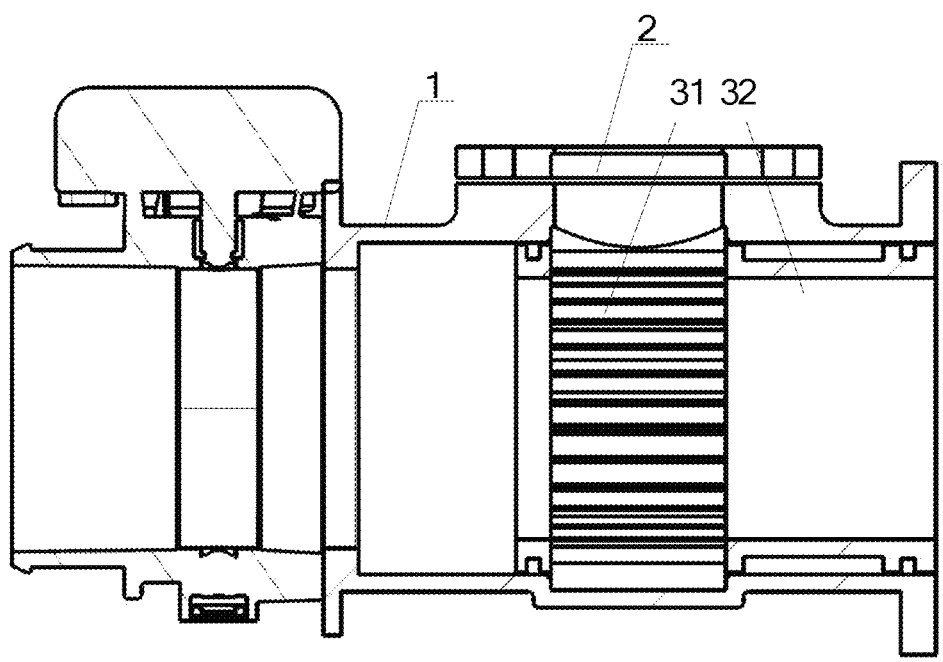
FIG. 5 is an arrangement structural view when the exhaust gas inlet channel is fully opened in the present application.

As shown in FIG. 4 and FIG. 5, FIG. 4 is an arrangement structural view when the opening degree of the exhaust gas inlet channel is adjusted in the present application; and FIG.

5 is an arrangement structural view when the exhaust gas inlet channel is fully opened in the present application.

When the gas guide cylinder slides to the bottom of the EGR pipe 1, only a small portion of the gas guide channel 31 is opposite to the exhaust gas inlet channel 2, a small amount of exhaust gas can enter into the EGR pipe 1, and the rest of the exhaust gas is blocked by the external of the blocking structure 32 of the gas guide cylinder. Certainly, when the gas guide cylinder extends into the bottom of the EGR pipe 1, the exhaust gas inlet channel 2 is completely blocked by the blocking structure 32 so as to avoid the exhaust gas backflow caused by excessive air pressure of the fresh air.

In FIG. 5, the gas guide channel 31 is directly opposite to the exhaust gas inlet channel 2, the exhaust gas introduced into the exhaust gas inlet channel 2 can directly enter into the EGR pipe 1, and at the moment, the maximum exhaust gas inlet amount is obtained, the blocking structure 32 extends into the EGR pipe to guide the sliding movement of the gas guide cylinder.

In a specific embodiment of the present application, an exhaust gas guide groove 15 corresponding to the position of the exhaust gas inlet channel 2 is circumferentially provided on the inner wall of the EGR pipe 1, and the length of the gas guide channel 31 is consistent with the groove width of the exhaust gas guide groove 15. Preferably, multiple gas guide channels 31 are evenly arranged around the cylinder wall of the gas guide cylinder.

The exhaust gas is fed into the EGR mixing chamber 5 from the exhaust gas inlet channel 2, and is mixed with the fresh air introduced into the EGR pipe 1 through the gas guide channel 31. Since the fresh air flows along the axial direction of the EGR pipe I during the conveying process, the mixing uniformity of the exhaust gas and the air is difficult to ensure by introducing the exhaust gas in a single direction. By providing the exhaust gas guide groove 15 around the circumferential direction of the inner wall of the EGR pipe 1, the exhaust gas guide groove 15 is in communication with the exhaust gas inlet channel 2. After being introduced, the exhaust gas is first filled into the exhaust gas guide groove 15 arranged around a circle of the gas guide cylinder.

Multiple gas guide channels 31 are provided and arranged around the circumferential direction of the gas guide cylinder by a circle, so that exhaust gas in the exhaust gas guide groove 15 is fed from each direction in the circumferential direction of the EGR mixing chamber 5, and in the air circulation process, the exhaust gas is turbulently mixed in each direction in the circumferential direction, so that the uniformity is improved.

In a specific embodiment of the present application, a guide vane 34 for guiding the inlet gas in the gas guide channel 31 is arranged on the inner wall of the gas guide cylinder, and the guide vane 34 is inclined with respect to the radial direction of the gas guide cylinder and extends inward. By providing the guide vane 34, the guide vane 34 is inclinedly arranged along the radial direction of the gas guide cylinder, and after the exhaust gas entering from the gas guide channel 31 is blocked by the guide vane 34, the exhaust gas is blown out in a spiral blown-out shape to the inner wall of the gas guide cylinder. The guide vane 34 is provided at an outlet of each guide channel 31 to allow the exhaust gas circulate in a spiral shape along the radial direction of the gas guide cylinder from outside to inside after being blown out and mix with the fresh air in a spirally turbulent shape, so that the mixing uniformity of the airflow in the gas guide cylinder is improved.

In a specific embodiment of the present application, the blocking structure 32 includes a subtractive groove 33 circumferentially provided around the gas guide cylinder, and the groove width of the subtractive groove 33 is consistent with the groove width of the exhaust gas guide groove 15. The gas guide cylinder is slidable in the EGR pipe 1, and since the outer diameter of the gas guide cylinder is consistent with the inner diameter of the EGR pipe 1, the resistance between the gas guide cylinder and the inner wall of the EGR cylinder 1 is increased in the sliding process of the gas guide cylinder driven by the driving device 4. The blocking structure 32 utilizes an outer wall on one end of the gas guide cylinder far away from the gas guide channel 31, and the blocking length of the gas guide cylinder is set to be greater than the length of the exhaust gas inlet channel 2, so that the introduction of the exhaust gas can be avoided. By providing the subtractive groove 33 arranged around the outer periphery of the gas guide cylinder at the position of the blocking structure where the gas guide cylinder is located, the blocking of the exhaust gas inlet channel can be achieved by using the groove side wall of the subtractive groove 33 to abut against the inner wall of the EGR pipe 1.

The width of the exhaust gas guide groove 15 is set to be consistent with the length of the gas guide channel 31, the width of the exhaust gas guide groove 33 is set to be consistent with the width of the exhaust gas guide groove 15, so that the outer wall of the gas guide cylinder can be arranged to be a symmetrical structure by a parting line of the gas guide channel 31 and the blocking structure 32, which facilitates control of the length of the sliding channel in the EGR pipe 1. The width of the exhaust gas inlet channel 2 is set to be consistent with the width of the exhaust gas guide groove 15, so that the sealing performance of the exhaust gas is ensured by the fitting position of the gas guide cylinder and the inner wall of the EGR pipe 1 during the ventilation process or the blocking process.

In a specific embodiment of the present application, the EGR pipe 1 includes an EGR main pipe 13 for supporting the driving device provided on one end of the EGR pipe I in the axial direction, and an exhaust gas mixing pipe 14 sleeved on the gas guide cylinder. The pipe diameter of the EGR main pipe 13 is the same as the inner diameter of the gas guide cylinder. In the gas inlet process of the internal combustion engine, the stability of the inlet pressure needs to be ensured, and combustion stability of the internal combustion engine is guaranteed.

The EGR pipe 1 is provided with an EGR main pipe 13 and an exhaust gas mixing pipe 14. A gas outlet 12 of the EGR main pipe 13 is connected to a gas inlet pipe of the internal combustion engine, a gas inlet 11 of the exhaust gas mixing pipe 13 is connected with an air inlet pipe, and the gas guide cylinder is installed from one side of the exhaust gas mixing pipe 14. Since the gas guide cylinder is slidable in the EGR pipe 1, in particular, in the exhaust gas mixing pipe 14, there is a sudden change in diameter between the inner diameter of the exhaust gas mixing pipe 14 and the end portion of the gas guide cylinder. The influence of the gas pressure change on combustion of the internal combustion engine can be avoided by controlling the thickness of the inner wall of the gas guide cylinder. The inner diameter of the gas guide pipe is set to be the same as the diameter of the EGR main pipe 13, the sudden change of the airflow input to the internal combustion engine can be avoided by controlling the input quantity of the exhaust gas and the fresh air and correcting the airflow by the EGR main pipe.

In a specific embodiment of the present application, the guide channel 31 is provided on the inner side of the gas guide cylinder in the sliding direction.

The driving device is a motor arranged on the outer wall of the EGR main pipe, or through a pneumatic device or a hydraulic driving structure, the gas guide cylinder is pulled to slide in the EGR pipe, and the sliding position of the gas guide cylinder is controlled by the driving device, that is, the width of the gas guide channel exposed to the exhaust gas guide groove is controlled, and the circulation area of the gas guide channel is changed, thereby achieving accurate control on the inlet air quantity of the exhaust gas. By providing the EGR pipe having the sliding structure and the gas guide cylinder, the flow of the exhaust gas through the EGR pipe and the gas guide cylinder can be controlled by the opening degree of the gas guide channel, the circulation area of the exhaust gas is adjusted, thereby achieving the modular design of the parts, so that the system is simplified, the structure is compact, and the cost is reduced.

Based on the EGR mixing and adjusting device according to the above embodiment, an internal combustion engine is further provided in the present application, which is provided with the EGR mixing and adjusting device provided in the above embodiment.

Since the internal combustion engine adopts the EGR mixing and adjusting device of the above embodiment, the beneficial effect of the internal combustion engine brought by the EGR mixing and adjusting device refers to the above embodiment.

The foregoing is merely a preferred embodiment of the present application and is not intended to limit the present application. For those skilled in the art, various modifications and variations can be made in the present application. Any modification, equivalent, adaptation and the like within the spirit and principles of the present application should be intended to be within the protection scope of the present application.

The invention claimed is:

1. An EGR mixing and adjusting device, comprising an EGR pipe internally provided with an EGR mixing chamber, wherein an exhaust gas inlet channel in communication with the EGR mixing chamber is provided on a side wall of the EGR pipe; and
    wherein a gas guide sliding block for blocking or opening the exhaust gas inlet channel is slidably provided in the EGR pipe along an axial direction, and the EGR mixing and adjusting device further comprises a driving device for driving the gas guide sliding block to slide to a predetermined opening degree,
    wherein, the gas guide sliding block comprises a gas guide channel communicating the exhaust gas inlet channel with the EGR mixing chamber, and a blocking structure for blocking the exhaust gas inlet channel,
    wherein, the gas guide sliding block is a gas guide cylinder slidably fitting with an inner wall of the EGR pipe, and the gas guide channel and the blocking structure are respectively arranged on cylinder walls at two ends of the gas guide cylinder in an axial direction,
    wherein, a guide vane for guiding an inlet gas in the gas guide channel is provided on the inner wall of the gas guide cylinder, and the guide vane is inclined with respect to a radial direction of the gas guide cylinder and extends inward.

2. The EGR mixing and adjusting device according to claim 1, wherein, an exhaust gas guide groove corresponding to a position of the exhaust gas inlet channel is circumferentially provided on an inner wall of the EGR pipe, and a length of the gas guide channel is consistent with a groove width of the exhaust gas guide groove; and a plurality of gas guide channels are uniformly arranged in a circumferential direction of the gas guide cylinder.

3. An internal combustion engine, wherein the internal combustion engine is internally provided with an EGR mixing and adjusting device according to claim 2.

4. The EGR mixing and adjusting device according to claim 2, wherein, the plurality of the gas guide channels are uniformly arranged around a cylinder wall of the gas guide cylinder.

5. An internal combustion engine, wherein the internal combustion engine is internally provided with an EGR mixing and adjusting device according to claim 4.

6. The EGR mixing and adjusting device according to claim 1, wherein, the blocking structure comprises a subtractive groove provided around a circumference of the gas guide cylinder, and a groove width of the subtractive groove is consistent with the groove width of the exhaust gas guide groove.

7. An internal combustion engine, wherein the internal combustion engine is internally provided with an EGR mixing and adjusting device according to claim 6.

8. The EGR mixing and adjusting device according to claim 1, wherein, the EGR pipe comprises an EGR main pipe arranged at one end of the EGR pipe in the axial direction to support the driving device, and an exhaust gas mixing pipe sleeved on the gas guide cylinder, and a pipe diameter of the EGR main pipe is the same as an inner diameter of the gas guide cylinder.

9. An internal combustion engine, wherein the internal combustion engine is internally provided with an EGR mixing and adjusting device according to claim 8.

10. The EGR mixing and adjusting device according to claim 8, wherein, the guiding channel is provided on an inner side of the gas guide cylinder in a sliding direction.

11. An internal combustion engine, wherein the internal combustion engine is internally provided with an EGR mixing and adjusting device according to claim 10.

12. An internal combustion engine, wherein the internal combustion engine is internally provided with an EGR mixing and adjusting device according to claim 1.

* * * * *